United States Patent

[11] 3,596,336

| [72] | Inventors | Anatoly Nikolaevich Barakin<br>Pavlovsky Posad, Trudovaya ul., 2/2, kv.53;<br>Vladimir Alexandrovich Maltsev,<br>Pavlovsky Posad, Volodarskogo ul., 93, kv.46, both of Moskovskaya Obl., U.S.S.R. |
|---|---|---|
| [21] | Appl. No. | 771,127 |
| [22] | Filed | Oct. 28, 1968 |
| [45] | Patented | Aug. 3, 1971 |

[54] MACHINE FOR PRODUCING MICA CAPACITOR PILES WITH FOIL LEADS
4 Claims, 9 Drawing Figs.

[52] U.S. Cl............................................. 29/25.42, 29/203, 29/203 L
[51] Int. Cl....................................................... H01g 13/00
[50] Field of Search............................................ 29/25.42, 203 D, 203 L, 203; 317/261

[56] References Cited
UNITED STATES PATENTS

| 1,557,724 | 10/1925 | Priess ........................... | 29/25.42 |
| 2,296,479 | 9/1942 | Nichols ........................ | 29/203 X |
| 3,073,007 | 1/1963 | Rubinstein et al............. | 29/25.42 |
| 3,315,331 | 4/1967 | Weiss ............................ | 29/25.42 |

Primary Examiner—John F. Campbell
Assistant Examiner—Carl E. Hall
Attorney—Waters, Roditi, Schwartz and Nissen ABSTRACT: A machine is provided for producing mica capacitor piles and comprises a plurality of transfer heads which periodically turn, lift, and drop for transferring capacitor piles between a plurality of stations where the piles have operations performed thereon. At a first station is located a mechanism for bending and additional pressing of the foil leads of the piles the mechanism alternatively cooperating with grippers of the transfer heads. At a subsequent station are dielectric strength monitors of the capacitor piles for detecting defective capacitor piles and causing removal of the defective piles from the grippers of the transfer heads. At a further station is a mechanism which receives the piles and effects a dipping of the piles into an impregnant.

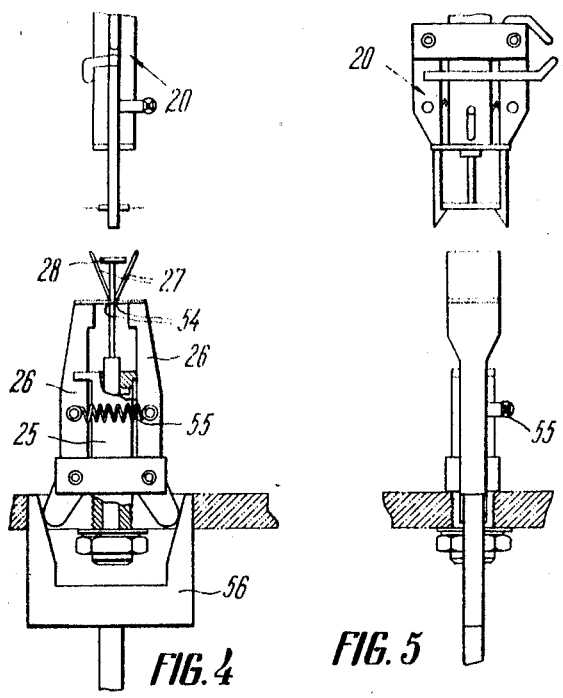
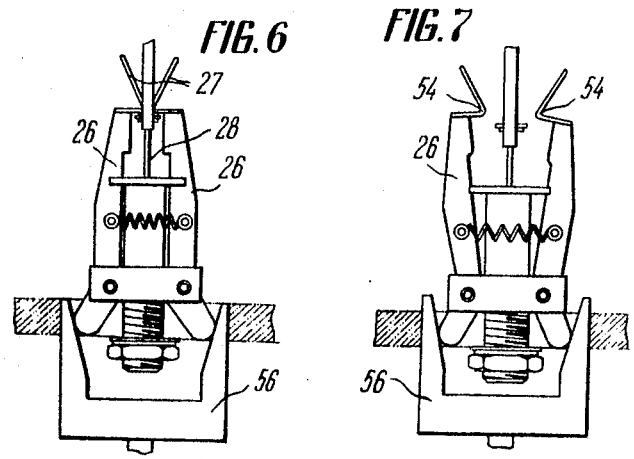
FIG. 4　FIG. 5
FIG. 6　FIG. 7

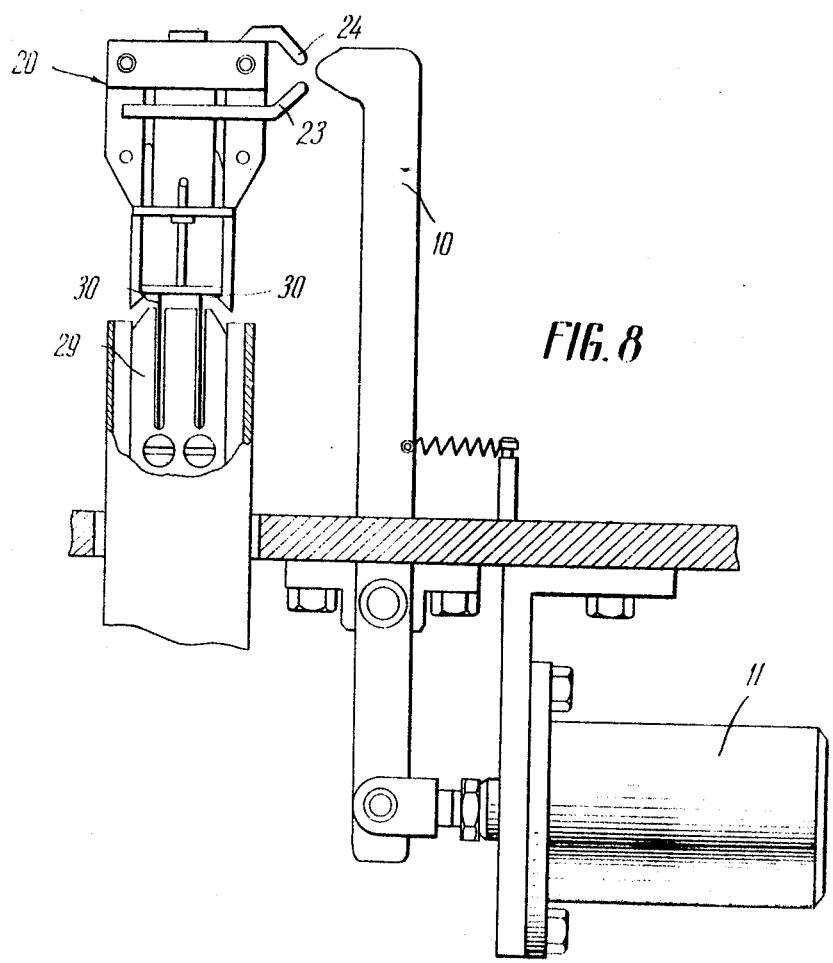

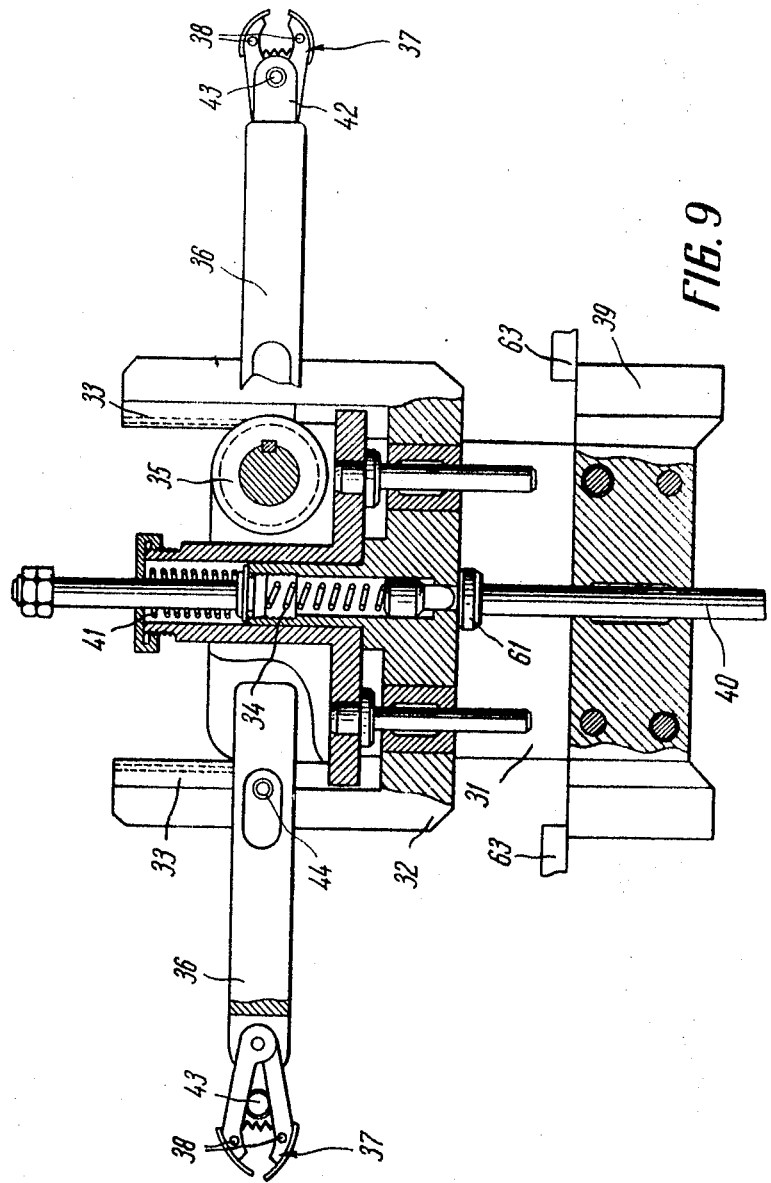

MACHINE FOR PRODUCING MICA CAPACITOR PILES WITH FOIL LEADS

The present invention relates generally to the art of manufacturing radio components and more particularly to machines for producing mica capacitor piles.

Known in the art are machines for producing mica capacitor piles comprising a foil feeding and cutting mechanism and a mechanism for arranging cutout foil lengths and mica plates into capacitor pile.

However, the design of hitherto known machines makes no provision for a foil lead-bending and additional pressing mechanism, a dielectric strength monitor of the capacitor pile and a mechanism for a complete dipping of the piles in an impregnant.

The aforementioned disadvantages do not enable said machines to provide a complete technological process of production of mica capacitor piles which results in waste of both scarce materials and labor. Thus, for example, the absence of the dielectric strength monitor in the machines results in the fact that spoiled piles are not rejected in due time and, consequently, are passed to all subsequent stations.

It is a general object of the present invention to eliminate the disadvantages mentioned above.

It is a specific object of the present invention to provide a machine capable of providing a complete technological process of manufacturing mica capacitor piles, including bending and additional pressing of foil leads, dielectric strength-monitoring of the piles being manufactured and a complete dipping of them in an impregnant. This object is achieved in a machine for producing the piles, comprising foil-feeding and cutting mechanisms, mechanisms for arranging cutout foil lengths and mica plates into the capacitor piles and transfer heads for carrying said piles by the provision according to the invention of mechanisms adapted to bend and additionally press the foil leads piles of the and capable of alternatively cooperating with the grippers of said transfer heads, as well as dielectric strength monitors of the piles, both the former and the latter mechanisms being located beneath said transfer heads, whereas located between the transfer heads is a mechanism effecting a complete dipping of the piles in an impregnant.

It is expedient that the housing of each of the mechanisms for bending and additional pressing of the foil leads of of the piles of the capacitors accommodate two spring-controlled arms provided with V-shaped grip cheeks and adapted to interact with the grippers of the transfer heads; furthermore, a rest spring-mounted with respect to the housing is located between said arms so as to effect additional pressing of the foil leads of a pile while cooperating with the bottom surface of the V-shaped grip cheeks.

Each of the dielectric strength monitors of the piles preferably provides contacts adapted to alternatively interact with the piles carried by the grippers of the transfer heads and a lever mounting an electromagnet adapted to act upon the auxiliary arms of the grippers of the transfer heads to cause them to release defective piles.

It is likewise advantageous that the housing of the mechanism for a complete dipping of the piles in an impregnant accommodate gear wheels with holders of arm-type spring-mounted heatable grippers adapted to be turned periodically by means of gear racks. Said racks are appropriately mounted on a spring-controlled yoke movable with respect to the housing from a push rod which is actuated by an eccentric of the camshaft and is adapted to act upon slider connected to the housing of the dipping mechanism so as to cause said mechanism to move. For better understanding the invention is now disclosed in an embodiment described hereinbelow with reference to the accompanying drawings, wherein:

FIG. 4 is a front elevation of the mechanism for bending and additional pressing of foil leads before proceeding to operate;

FIG. 5 is a side elevation of mechanism in FIG. 4;

FIG. 6 is a front elevation of the mechanism for bending and additional pressing of foil leads while operating;

FIG. 7 is a front elevation of the mechanism for bending and additional pressing of foil leads while releasing a finished capacitor pile;

Figure 1:
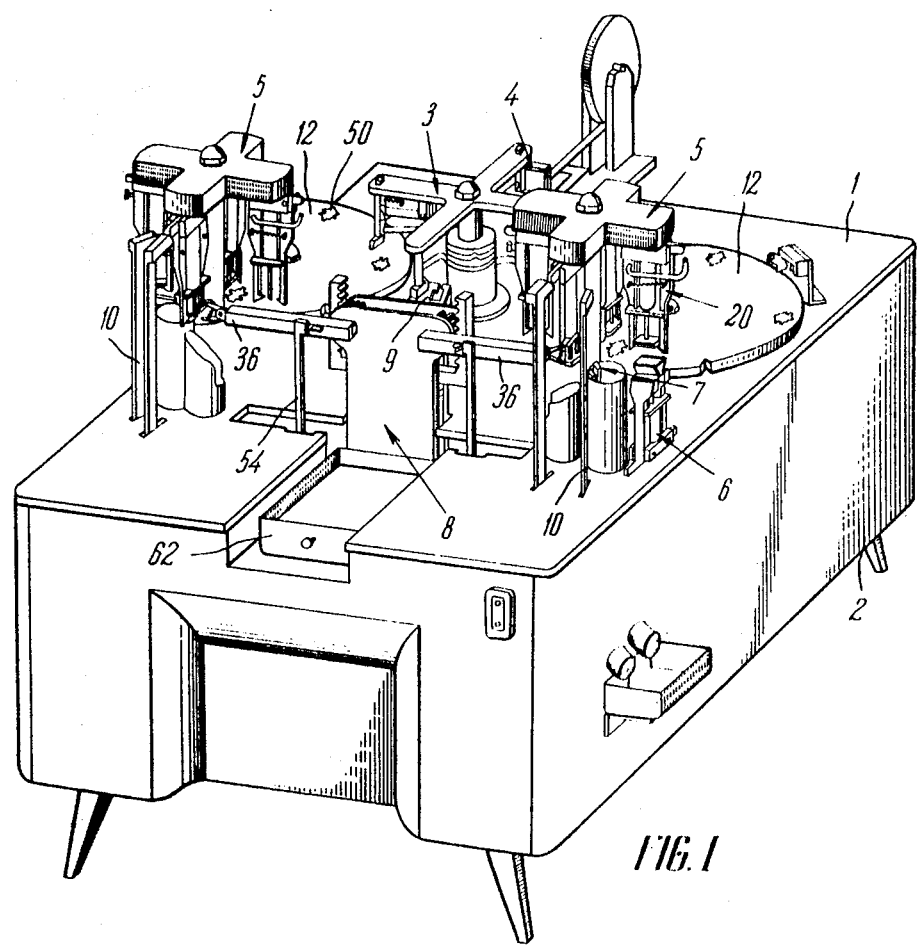
FIG. 1 is a general schematic view of the machine disclosed herein.
Figure 2:
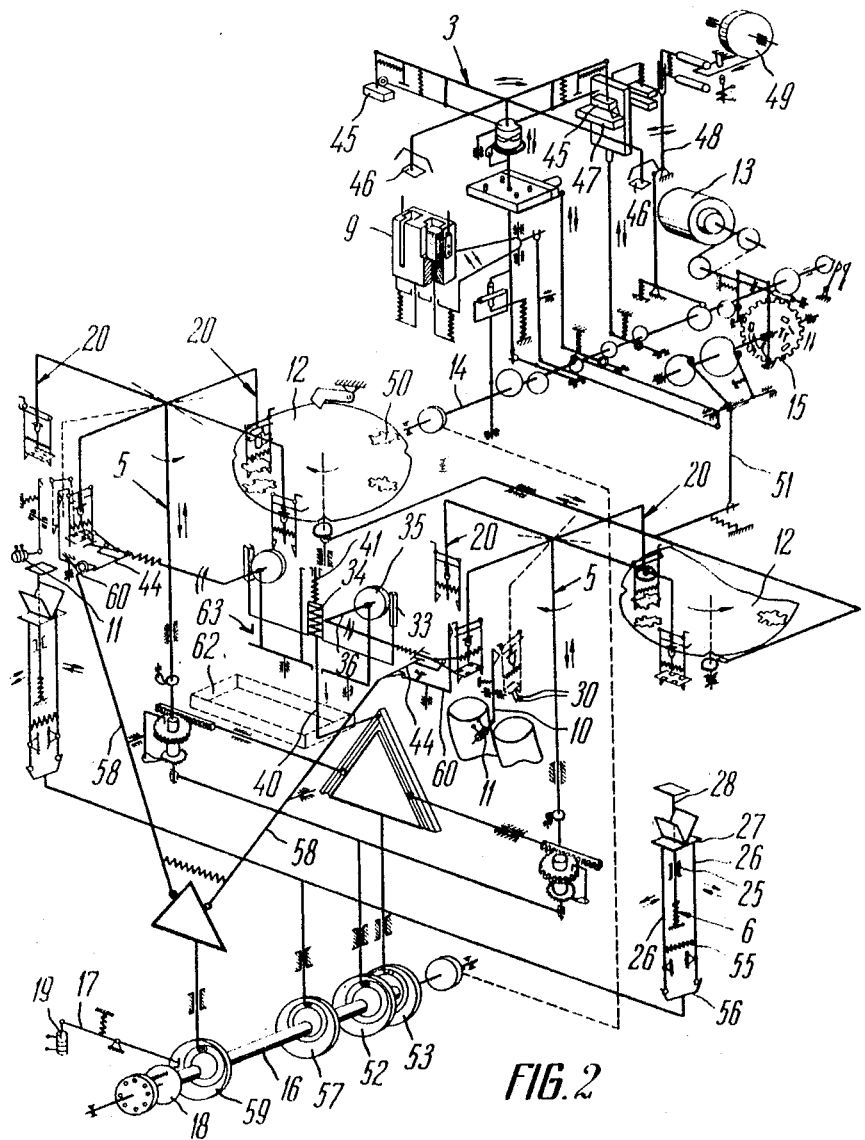
FIG. 2 is a kinematic diagram of the machine disclosed herein.

FIG. 8 shows a side elevational view, partly in section, of dielectric strength monitor of a pile; and FIG. 9 illustrates the mechanism for a complete dipping of capacitor pile in an impregnant. Now referring to FIG. 1, a top plate 1 of a machine bed 2 supports the following major components: a mechanism 3 for arranging foil leads and mica plates into a pile; a mechanism 4 for feeding and cutting out foil leads: transfer heads 5 for carrying the piles; mechanisms 6 for bending and additional pressing of foil leads; dielectric strength monitors 7 of the piles being manufactured; a mechanism 8 for a complete dipping of the piles in an impregnant; a magazine or container 9 with mica plates; kickout levers 10 with electromagnets 11 (FIG. 2) for rejecting defective piles; and pile assembly disks 12 (FIG. 1). accommodated inside the machine bed 2 are: a motor 13 (FIG. 2), camshaft 14, a foil lead and mica plate counting disk 15, a camshaft 16, a starting lever 17, a clutch 18 and a motor 19.

Figure 3:
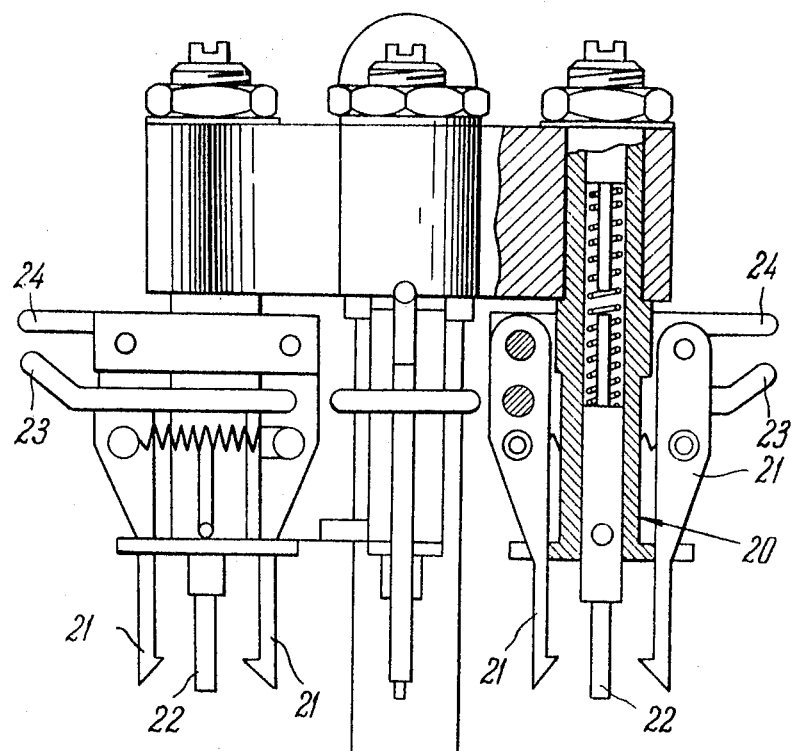
FIG. 3 is a side elevational view, partly in section, of a transfer head of the machine disclosed herein.

Each of the transfer heads FIG. 3) is provided with four grippers 20, each of said grippers incorporating two spring-loaded arms 21 and a spring-loaded stop 22. The arms 21 are provided with auxiliary (extension) arms 23 and 24.

A housing 25 of each of the mechanisms for bending and additional pressing of the pile of foil leads (FIGS. 4,5,6 and 7) accommodates two spring-controlled arms 26 provided with V-shaped grip cheeks 27 and arranged between said arms is a rest 28 is spring-mounted with respect to the housing 25.

A holder 29 (FIG. 8) of the dielectric strength monitor of the piles supports two spring contacts 30 fixed in position thereon.

A housing 31 (FIG. 9) of the mechanism for a complete dipping of the piles in an impregnant incorporates a yoke 32 with gear racks 33 and a stiff spring 34, gear wheels 35, holders 36 of spring-mounted grippers 37 with heaters 38, a slider 39 with a push rod 40 and a weak spring 41. The holders 36 carry spring-loaded sliders 42 with pivot pins 43 and stops 44.

The herein-disclosed machine operates as follows. The mechanism 3 (FIG. 2) for arranging foil leads and mica plates into a pile is operative with its vacuum cups 45 and 46 to pick up mica plates held in the container 9 and a foil lead from a stationary blade 47 onto which said lead is fed from a roll 49 by a feed arm 48, whereupon said mica plates and said foil leads are alternatively laid into hollows 50 in the assembly disks 12. Then a linkage 51 causes the assembly disk to so turn that the hollow accommodating an assembled pile is positioned exactly beneath one of the grippers 20 of the transfer head. Next a cam 52 acts upon each transfer head and, consequently, each gripper 20, thus causing them to move down; then one of the grippers catches the assembled piles from a corresponding hollow of the assembly disk and lifts it. Thereupon each transfer head is caused to turn under the effect of a cam 53 so that the gripper 20 (FIGS. 4 and 5) carrying the assembled pile is positioned over the mechanism for bending and additional pressing of the foil leads. This done, the transfer heads starts lowering so that each pile is free to press against the spring-loaded rest 28 of the above-mentioned mechanism, thus bringing apart the V-shaped grip cheeks 27 which effect a preliminary bending of the foil leads. Further lowering of the transfer heads causes the top surfaces of the piles to traverse bottom surfaces 54 of the V-shaped grip cheeks, spring 56 to bring the arms 26 together and the bottom surfaces 54 of the V-shaped grip cheeks effect a complete bending of the foil leads (FIG. 6). After this the transfer heads lift slightly and the spring-loaded rest 28 forces the pile against the bottom surfaces of the V-shaped grip cheeks 27, thereby effecting the additional pressing of the foil leads, whereupon the transfer heads drop down into the bottom-most position (FIG. 7).

Next a fork 56 while being actuated by a cam 57 (FIG. 2) moves upwards, thus bringing apart the arms 26 (FIG. 7). The transfer heads set the piles into the topmost position. Further turning of the transfer heads causes the piles with the bent and additionally pressed foil leads to be brought to the contacts 30 FIG. 8 of the dielectric strength monitor. A defective pile closes the circuit of the electromagnet 11 which acts through the kick-out lever 10 upon the auxiliary arms 23 and 24 of the grippers 20. As a result the defective pile is released to drop, whereas the acceptable capacitor pile is transferred, as a result of the next turn of the transfer head, by the spring-mounted gripper 37 (FIG. 9) of the mechanism for a complete dipping of the pile in an impregnant.

The piles are transferred by the gripper 37 as follows. Arms 58 FIG. 2 actuated by a cam 59, act upon the stops 44 (FIG. 9) of the spring-loaded sliders 42 with the result that the latter while travelling along the pivot pins 43, move apart the spring-mounted grippers 37 into which the piles are inserted. Then the arms 58 while returning to the initial position, release the stops 44 of the spring-loaded sliders 42, whereby the piles are gripped by the gripper 37. Further travelling of the arms 58 (FIG. 2) causes the grippers to release through the action of linkages 60 and the auxiliary arms 23 and 24 (FIGS. 3), while the cam 53 (FIG. 2) causes the push rod 40 (FIG. 9) to move downwards. During its movement releases first the stiff spring 34 and then the weak spring 41 which moves the yoke 32 downwards. The gear racks 33 through the gear wheels 35 cause the holders 36 to turn, thus releasing the piles. The push rod 40 while moving further downwards acts with its projection 61 acts upon the slider 39, thereby causing the entire mechanism for a complete dipping of piles to move downwards so as to be dipped in a tray or cuvette 62 containing an impregnant (FIG. 2), wherein impregnation of the piles occurs.

Thereupon the push rod 40 (FIG. 9) while being actuated by the cam 53, causes the mechanism for a complete dipping of the pile to move upwards until it contacts the stops 63; further movement of the push rod causes the yoke 32 to compress the weak spring 41 and set the holder 36 into a horizontal position, whereupon the stiff spring is likewise compressed and the mechanism for a complete dipping of the pile assumes its initial position. In the course of movement of the holders into the initial position the arms 58 (FIG. 2) act upon the stops 44 (FIG. 9) of the spring-loaded sliders 42 with the result that the grippers 37 are brought apart to release a finished pile.

We claim:
1. A machine for producing mica capacitor piles with foil leads, comprising a foil feeding and cutting mechanism, a mechanism for arranging foil leads and mica plates into a capacitor pile and transfer heads which periodically turn, lift and drop for transferring said capacitor piles between a plurality of stations where said piles have operations performed thereon, said transfer heads including arm-type spring-controlled grippers for releasably holding said piles, said machine further comprising mechanisms located beneath said transfer heads at selected stations for bending and additional pressing of the foil leads and adapted to alternatively cooperate with the gripper of said transfer heads, dielectric strength monitors of capacitor piles positioned at selected stations for detecting defective capacitor piles, and a further mechanism at one of said stations for receiving said piles to effect a complete dipping of said piles into an impregnant, the latter said mechanism being likewise adapted to alternatively cooperate with said transfer heads.

2. A machine as claimed in claim 1 wherein said mechanisms for bending and additional pressing of the foil leads of capacitor piles includes a housing accommodating two spring-controlled arms provided with V-shaped grip cheeks and adapted to interact with the grippers of said transfer heads, and a spring-mounted rest located between said arms and adapted to effect additional pressing of the foil leads of capacitor piles while cooperating with the bottom surfaces of said V-shaped grip cheeks.

3. A machine as claimed in claim 1 wherein each of said dielectric strength monitors of capacitor piles comprises spring contacts adapted to alternatively interact with the piles carried thereto by the grippers of the transfer heads, and a lever carrying an electromagnet which is adapted to act upon the grippers of said transfer heads so as to release defective piles.

4. A machine as claimed in claim 5, wherein said mechanism for a complete dipping of capacitor piles into an impregnant comprises a housing including gear wheels with holders of arm-type spring-mounted heatable grippers, means for periodically turning the latter grippers including rack gears, a spring-controlled yoke supporting said rack gears, a push rod coupled to said yoke to control movement thereof with respect to said housing, an eccentric cam coupled to said push rod to actuate the same, and a slider connected to said housing and actuated by said push rod to move said dipping mechanism and effect complete dipping of capacitor piles into an impregnant.